(12) United States Patent
Serrano Sanchez et al.

(10) Patent No.: US 6,386,232 B2
(45) Date of Patent: May 14, 2002

(54) FLUID DISTRIBUTOR VALVE

(75) Inventors: Emilio Serrano Sanchez, Rubi; Juan Capdevila Arnau, Sant Feliu de Pallarols; Armand Puiggros Roig, Sabadell, all of (ES)

(73) Assignee: Sacopa, S.A., Girona (ES)

( * ) Notice: Subject to any disclaimer, the term of this patent is extended or adjusted under 35 U.S.C. 154(b) by 0 days.

(21) Appl. No.: 09/785,734

(22) Filed: Feb. 16, 2001

(30) Foreign Application Priority Data

Feb. 21, 2000 (ES) ...................................... 200000421 U

(51) Int. Cl.[7] .............................................. F16K 31/16
(52) U.S. Cl. .............. 137/624.14; 137/627; 137/119.07
(58) Field of Search ............................. 137/624.2, 627, 137/624.14, 119.07

(56) References Cited

U.S. PATENT DOCUMENTS 4,313,455 A * 2/1982 Pitman ........................ 137/119
4,570,663 A * 2/1986 Gould et al. ................. 137/119
4,592,379 A * 6/1986 Goettl ..................... 137/627 X
4,817,656 A * 4/1989 Gould ............... 137/624.14 X
6,325,087 B1 * 12/2001 Tarr ................... 137/624.14 X

* cited by examiner

Primary Examiner—Kevin Lee
(74) Attorney, Agent, or Firm—Steinberg & Raskin, P.C.

(57) ABSTRACT

A fluid distributor valve including a chamber formed by a body and bonnet and having an intermediary plate through which a central shaft extends, a rotor being fitted around said central shaft and being submitted to the action of the fluid flowing into said chamber, said body having fluid outlet bottom orifices being each closed by a respective stopper, the stoppers being prised open by activation of a reducing gear connected to said rotor, This valve includes a controlling and arresting device by which the fluid passage towards the rotor is controlled and can even be totally blocked in order to thus adjust the time during which each outlet will be held open, and also in order to keep a given outlet open and all of the remaining outlets closed when the valve has been arrested.

14 Claims, 2 Drawing Sheets

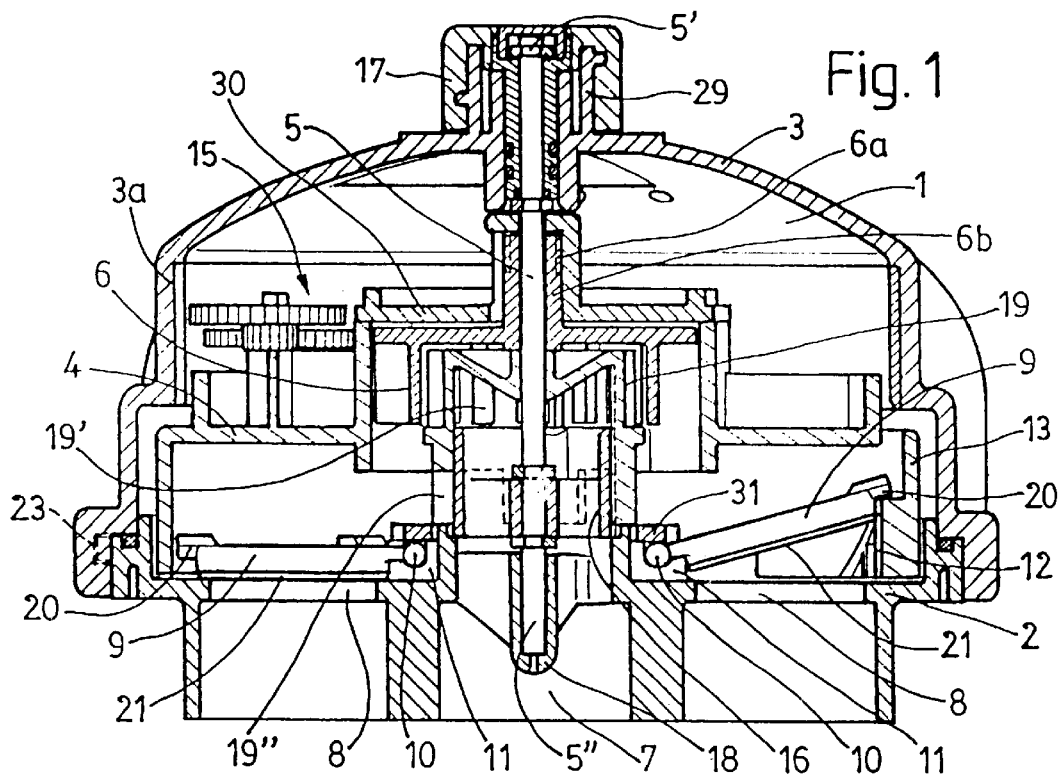
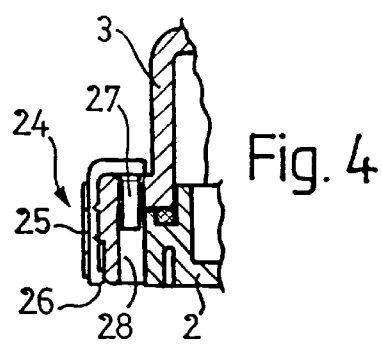
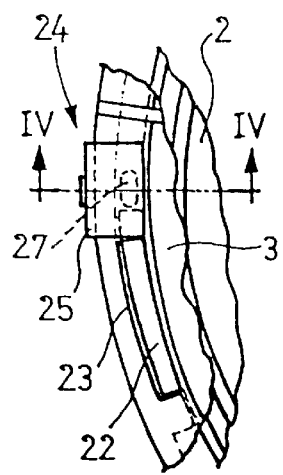

FLUID DISTRIBUTOR VALVE

FIELD OF THE INVENTION

The present invention relates to a fluid distributor valve.

BACKGROUND OF THE INVENTION

Although the distributor valve according to the present invention can be used in different facilities and for different purposes it has been preferably provided to be used in conjunction with swimming pool bottom flushing devices, the devices comprising several nozzles installed in the swimming pool bottom and through which a water jet is radially ejected flush with the bottom of the swimming pool.

Distributor valves provided to fulfill the function have been commercially available for a number of years, the valves generally comprising a chamber with a water inlet opening and several water outlet openings (one for one or more nozzles), each of the openings comprising a stopper being actuated by means of a reducing gear acting by virtue of the action of the infeed water on a rotor with which the gear is engaged.

OBJECTS AND SUMMARY OF THE INVENTION

The fluid distributor valve according to the present invention has as its object a valve sensibly improving the known valves. One of the improvements comprising, in the presence of only one device with external control means, the device allowing for a control of the time during which each outlet opening will be held open as well as to arrest the valve in a given position wherein one only outlet opening is held open.

Another of the advantages consists in closing each of the outlet openings or orifices by means of a respective flap, the flaps ensuring that a flap will not be closed till the next one is opened, the flaps having a flat seal assuring a tight closure.

The body and the bonnet forming the chamber are also advantageously joined together by means of a bayonet lock provided with a fast-fixed safety catch thereby eliminating the need for the use of tools in joining the body and the bonnet to one another. Upon removal of the bonnet from the body the whole mechanism becomes visible, thereby facilitating the access to the interior of the valve in order to carry out its cleaning and maintenance.

In the valve according to the present invention, the water flows into the chamber through the lower, central portion of its body, and whereby the bonnet, having no connections, is thereby easily removable. Since the gear wheels are furthermore arranged in the upper portion of the chamber they are not subject to the direct action of the inflowing water, and hence the gear wheels are protected from wear and from the deposition of particles that could foul them and hinder their correct operation.

The valve operation controlling and arresting device comprises a cylinder integral with a central shaft being vertically shiftable from an external control means, said cylinder being slidable within a diffuser coaxially installed inside the rotor and forming part of an intermediary plate provided in the chamber, in such a way that when being lifted the cylinder does progressively close the openings of the diffuser and at the same time opens the openings provided in the downwardly extending edge of the diffuser and directly communicating with the lower region of the chamber where the water outlet orifices have been provided.

BRIEF DESCRIPTION OF THE DRAWINGS

These and other characteristics will be best made apparent by the following detailed description whose understanding will be made easier by the accompanying two sheets of drawings showing a practical embodiment cited only by way of an example not limiting the scope of the present invention.

In the drawings:

FIG. 1 is a sectional elevation of the assembly of the distributor valve according to the present invention;

FIG. 2 is a perspective view of said assembly shown in FIG. 1;

FIGS. 3 is a plan-view of the fast-fixed safety catch of the bayonet lock joining together the body and bonnet according to the present invention;

FIGS. 4 is a sectional elevation of the fast-fixed safety catch of the bayonet lock joining together the body and bonnet according to the present invention;

DETAILED DESCRIPTION OF THE INVENTION

Figure 5:
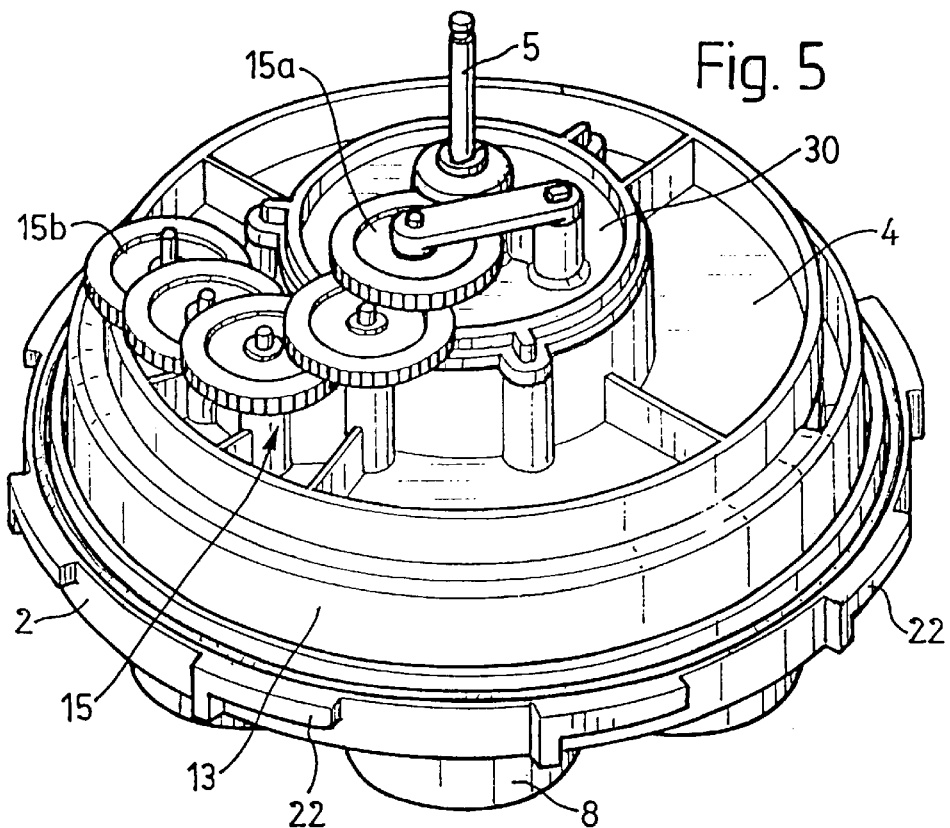
FIG. 5 is a perspective view of the distributor valve according to the present invention with the bonnet removed.
Figure 6:
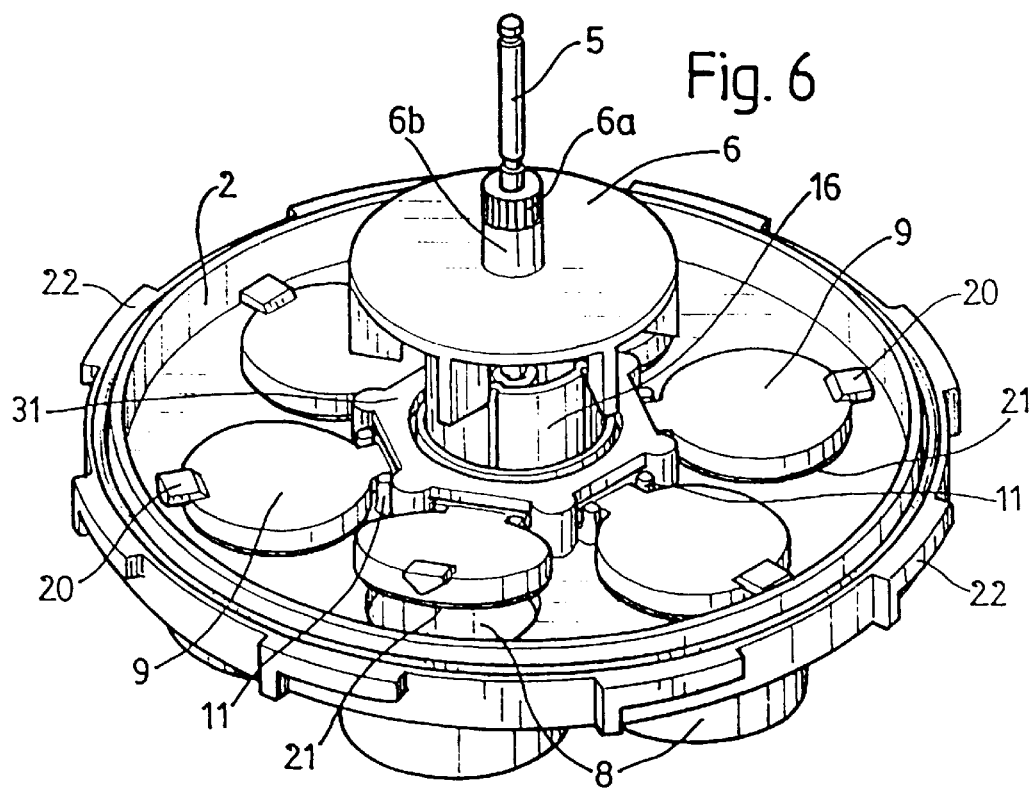
FIG. 6 is a perspective view of the distributor valve according to the present invention with the intermediary plate and the reducing gear removed therefrom.

According to the drawings the fluid distributor valve has a chamber 1 defined by a circular base body 2 and closed by means of a domed bonnet 3. An intermediate plate 4 is rotatably fitted around a vertical central shaft 5 in the chamber. A rotor 6 is also fitted in a freely rotatable arrangement on the vertical shaft 5, the rotor 6 being actuated by virtue of the action of a fluid flowing into the distributor valve through a bottom opening 7 centrally provided in the body 2. The circular base body 2 having formed around the opening 7 a plurality of fluid outlet orifices 8. The orifices 8 being closed by stoppers formed by a respective circular flap 9, wherein the flaps are hinged at their innermost end by means of a pin 10 fitted into corresponding forked protrusions 11 formed along a top surface of the circular base body 2.

The flaps 9 are sequentially raised as they are prised at their end opposite to that of their hinged connection as a ramp 12 passes underneath said flaps, said ramp being formed on the inside of the bottom edge of the periphery 13 of the intermediary plate 4. The intermediary plate 4 is fitted on its top surface with a reducing gear 15 whose first gear wheel 15a meshes with pinion 6a provided at the end of a top tubular shaft 6b of rotor 6, whereas the last wheel 15b of the reducing gear 15 meshes with an internal gear rim 3a provided on the inner periphery of bonnet 3.

The distributor valve according to the present invention comprises a central device by means of which the fluid passage from the bottom opening 7 towards the rotor 6 is controlled and can even be blocked if desired in order to thus adjust the time during which the flaps 9 will be held open, and also in order to keep only one of these flaps open when the valve has been arrested.

The controlling and arresting device comprises a hollow cylinder 16 integral with the central shaft 5. The shaft 5 being vertically shiftable by means of an external control means 17 to which the shaft 5 is fitted at its upper end 5', whereas at its lower end 5" the shaft is supported and guided in a pocket 18 being axially integral with body 2 in its bottom opening 7. The cylinder 16 is slidably fitted within a diffuser 19 coaxially installed inside rotor 6 and forming part of the intermediary plate 4, in such a way that when being lifted the cylinder 16 does progressively close the peripheral openings 19' of diffuser 19, and at the same time opens the openings 19" provided in the downwardly extending edge of the diffuser and directly communicating with that region of the valve where the outlet orifices 8 have been provided.

Flaps 9 have at their outermost end an overhanging appendage 20 with a dihedral lower surface such that the appendage is urged by the ramp 12. The flaps 9 having attached to their lower edge a flat seal 21 assuring the tight closure of the fluid outlet orifices 8.

Bonnet 3 is fitted to body 2 by means of a bayonet lock, for such a purpose the periphery of body 2 having corresponding angular protrusions 22 provided to fit into the recesses 23 of the periphery of bonnet 3 to which a safety catch 24 has been fitted consisting of a strip 25 having a cross-section in the shape of an inverted L and being provided with a bottom rib 26 by way of a stop limiting the vertical shift of the strip. The strip 25 having its inner surface provided with two horizontal grooves selectively engaging a rib provided on the periphery of bonnet 3 in order to thus fix the locked and unlocked positions in the fitting of bonnet 3 to body 2. In the locked position one of said protrusions 22 of the periphery of body 2 abutting against a peg 27 being integral with strip 25 and slidably fitted into a vertical orifice 28 of the very periphery of bonnet 3.

The central shaft 5 is lifted and lowered by means of turning the control means 17 formed by an internally threaded knob by way of a nut sliding along an externally threaded neck 29 formed on the top end of bonnet 3.

At 30 is shown a circular cover fitted to intermediary plate 4 and acting as an upper stop for rotor 6. At 31 is shown a ring provided to be attached to body 2 and acting as an upper stop for the hinged connection of flaps 9 to the body.

The present invention has been described herein with reference to preferred embodiments of the invention however the description provided herein is for illustrative purposes and should not be considered to be exhaustive. It is understood that modifications and variations of the above describe preferred embodiments are possible without departing from the spirit or scope of the present invention.

We claim:

1. A fluid distributor valve comprising:
   a chamber (1) formed by a body (2) and a bonnet (3) and having an intermediary plate (4), a central shaft (5) extending through said intermediary plate and a rotor (6) being submitted to the action of the fluid flowing into said chamber, said body having fluid outlet bottom orifices (8) being each closed by a respective stopper, said stoppers being pried open by means activated by a reducing gear (15) connected to said rotor (6); and
   a controlling and arresting device structured and arranged so that the fluid passage towards rotor (6) is controlled and can even be totally blocked in order to thus adjust the time during which each outlet (8) will be held open, and also in order to keep a given outlet open and all of the remaining outlets closed when the valve has been arrested.

2. A fluid distributor valve as per claim 1, wherein the controlling and arresting device comprise a cylinder (16) being integral with the central shaft (5), said central shaft (5) being vertically shiftable by means of an external control means (17), said cylinder being slidably fitted within a diffuser (19) coaxially installed inside said rotor (6) and forming part of the intermediary plate (4), such that when said shaft (5) is lifted the cylinder (16) does progressively close openings (19') of diffuser (19), and at the same time opens openings (19") provided in a downwardly extending edge of said diffuser and directly communicating with that region of the valve where the outlet orifices (8) have been provided.

3. A fluid distributor valve as per claim 1, wherein the stoppers of the fluid outlet orifices are each formed by a respective flap (9), said flaps being hinged at an end (10) and being urged at the opposite end by a ramp (12) provided on a peripheral bottom edge (13) of said intermediary plate (4), said intermediary plate (4) rotating because of the engagement of the reducing gear (15) fitted on said plate with an internal gear rim (3a) provided on the inner periphery of bonnet (3).

4. A fluid distributor valve as per claim 3, wherein each of said flaps (9) have attached to their lower surface a respective flat seal (21).

5. A fluid distributor valve as per claim 1, wherein said bonnet (3) is fitted to said body (2) by means of a bayonet lock (22–23).

6. A fluid distributor valve as per claim 5, wherein on the periphery of the bonnet (3) a fast-fixed safety catch (24) has been provided to lock said bonnet and body (2) in their mutually engaged position, said safety catch comprising a peg (27) provided to be fitted into an orifice (28) of the periphery of bonnet (3), one of the protrusions (22) of the bayonet lock provided on the outer periphery of body (2) abutting against said peg (27).

7. A fluid distributor valve as per claim 1, wherein the fluid flows into chamber (1) through a central bottom opening (7) provided in body (2).

8. A fluid distributor valve comprising:
   a chamber (1) having a body portion (2), a bonnet (3) and an intermediary plate (4);
   a central shaft (5) extending through said intermediary plate (4);
   a rotor (6) operatively coupled to said central shaft (5), said rotor (6) being subjected to a fluid flowing into said chamber (1);
   a reducing gear (15) connected to said rotor (6); wherein said body portion (2) is provided with a plurality of fluid outlet orifices (8) formed in a bottom surface thereof, each of said orifices (8) being closed by a respective stopper structured and arranged to be pried open by means activated by said reducing gear (15); and
   a controlling and arresting device structured and arranged to control fluid passage towards said rotor (6) and to block fluid passage towards said rotor (6) to thereby adjust the time during which each outlet (8) will be held open, and also to keep a given outlet (8) open and all of the remaining outlets (8) closed when said valve has been arrested.

9. The fluid distributor according to claim 8, wherein said controlling and arresting device comprises:
   a cylinder (16) integral with said central shaft (5), wherein said central shaft (5) is vertically shiftable by means of an external control means (17), wherein said cylinder (16) is slidably fitted within a diffuser (19) coaxially installed inside said rotor (6) and forming a part of said intermediary plate (4), said diffuser (19) having a plurality of upper openings (19') formed along an upper region of said diffuser (19) and a plurality of lower opening (19") formed along a downwardly extending edge of said diffuser (19), whereby when said diffuser (19) is lifted said cylinder (16) progressively closes said upper openings (19') of diffuser (19) and simultaneously opens said lower openings (19") provided in the downwardly extending edge of said diffuser (19), thereby directly communicating said fluid flow with a region of the valve where said outlet orifices (8) are provided.

10. The fluid distributor valve according to claim 8, wherein said stoppers of said fluid outlet orifices (8) comprise a flap (9), said flaps (9) being hinged at an end (10) and being urged at an opposite end by a ramp (12) provided on an inside of the peripheral bottom edge (13) of said intermediary plate (4), said intermediary plate (4) rotating due to the engagement of said reducing gear (15) with an internal gear rim (3a) provided on an inner periphery of bonnet (3).

11. The fluid distributor valve according to claim 10, wherein each of said flaps (9) are provided along their lower surface with a respective flat seal (21).

12. The fluid distributor valve according to claim 8, wherein said bonnet (3) is fitted to said body (2) by means of a bayonet lock (22–23).

13. The fluid distributor valve according to claim 12, further comprising:
a fast-fixed safety catch (24) provided on said periphery of said bonnet (3) for locking said bonnet and body portion (2) in their mutually engaged position, said safety catch comprising a peg (27) provided to be fitted into an orifice (28) of the periphery of bonnet (3), one of the protrusions (22) of the bayonet lock provided on the outer periphery of body (2) abutting against said peg (27).

14. The fluid distributor valve according to claim 8, wherein said fluid flows into chamber (1) through a central bottom opening (7) provided in said body portion (2).

* * * * *